United States Patent [19]

Linde et al.

[11] Patent Number: 5,312,124

[45] Date of Patent: May 17, 1994

[54] STEERABLE AXLE SUPPORT LINKAGE

[75] Inventors: Gilbert W. Linde, Lancaster; Joseph C. Hurlburt, Paradise, both of Pa.

[73] Assignee: Ford New Holland, Inc., New Holland, Pa.

[21] Appl. No.: 974,652

[22] Filed: Nov. 12, 1992

[51] Int. Cl.⁵ .............................................. B62D 1/00
[52] U.S. Cl. ..................................... 280/97; 280/109; 180/156; 180/266
[58] Field of Search ................... 280/95.1, 97, 98, 85, 280/89, 109, 113, 117; 180/79.4, 144, 155, 156, 266, 267

[56] References Cited

U.S. PATENT DOCUMENTS

| 3,370,670 | 2/1968 | Love | 180/79.2 |
| 5,046,577 | 9/1991 | Hurlburt | 280/97 |

FOREIGN PATENT DOCUMENTS 1630721 8/1967 Fed. Rep. of Germany .

89/07545 8/1989 PCT Int'l Appl. .

*Primary Examiner*—Margaret A. Focarino
*Assistant Examiner*—Paul Dickson
*Attorney, Agent, or Firm*—Larry W. Miller; Frank A. Seemar

[57] ABSTRACT

A tractor having a steerable axle that pivotally moves laterally in response to a corresponding steering action of the steerable wheels mounted on the steerable axle is disclosed wherein the front of the axle is pivotally supported by a four-bar linkage to control vertical movement of the chassis relative to the steerable axle during lateral relative movement between the chassis and the axle. The mechanism is composed of a spherical ball joint connecting the steerable axle to the chassis, a front carrier member pivotally connected to the chassis, and a pair of link members pivotally interconnecting the carrier member and the steerable axle. All pivot axes associated with the carrier member and the link members coincide at the spherical ball joint.

21 Claims, 6 Drawing Sheets

Fig. 7
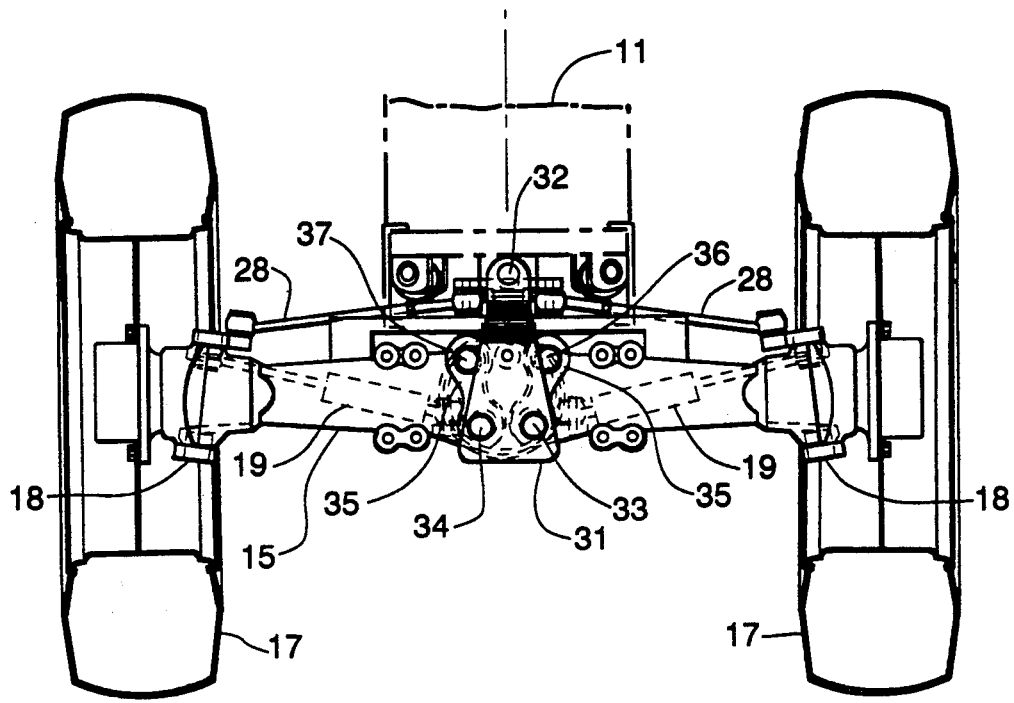
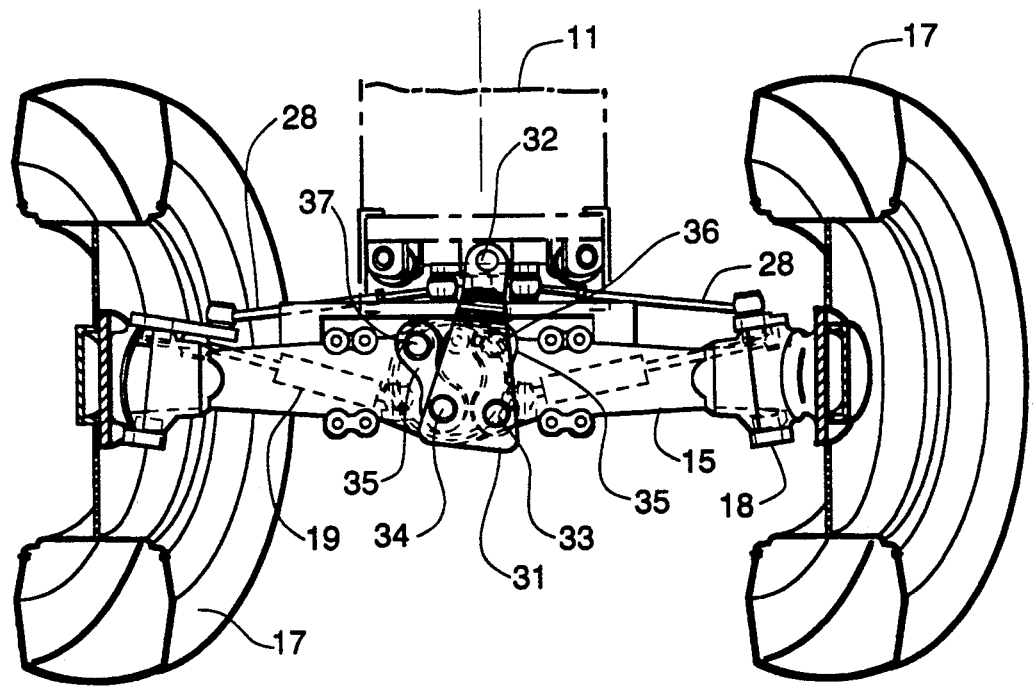
Fig. 8

STEERABLE AXLE SUPPORT LINKAGE

BACKGROUND OF THE INVENTION

This invention relates generally to a steering mechanism for an agricultural tractor in which the front axle is laterally shiftable in response to a steering movement of the steerable wheels and, more particularly, to a linkage mechanism pivotally connecting a laterally shiftable steering axle to a vehicle chassis.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Supplemental driving power is often provided through the steerable ground engaging wheels, while a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse displacement of cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited by tire size and track setting to a given restricted turning angle. This maximum turning angle defines the minimum turning radius of the tractor for a given chassis clearance width, axle oscillation angle, wheel base length and king pin spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length. The mechanism mounting the steerable axle to the vehicle chassis must accommodate the relative lateral movement between the steering axle and the chassis and would preferably maintain a substantially constant chassis elevation as the axle and chassis move relative to one another in a generally horizontal plane.

SUMMARY OF THE INVENTION

It is an object of this invention to overcome the aforementioned disadvantages of the prior art by providing a four-bar linkage apparatus interconnecting the transverse steerable axle and the vehicle chassis.

It is an advantage of this invention that the transverse axle maintains a generally substantially constant chassis elevation during relative movement between the axle and the chassis.

It is another advantage of this invention that any limited relative vertical movement of the tractor chassis relative to the transverse axle occurs in a generally parallel orientation.

It is a feature of this invention that all of the pivot axes of the linkage interconnecting the transverse steering axle and the vehicle chassis intersect at the rearward pivot joint connecting the center housing of the steering axle to the vehicle chassis.

It is another feature of this invention that the rearward pivot joint connecting the transverse axle to the vehicle chassis is a spherical ball joint.

It is still another advantage of this invention that the spherical ball joint forming the pivotal connection of the transverse axle to the vehicle chassis allows a universal movement of the transverse axle, including the lateral movement in a generally horizontal plane needed to improve vehicle steering characteristics.

It is still another feature of this invention to provide a carrier member pivotally connected to the vehicle chassis to support a pair of link members pivotally interconnecting the carrier member and the steerable axle to provide a four-bar linkage for lateral shifting movement between the axle and the chassis.

It is yet another feature of this invention that the carrier member and link members are positioned forwardly of the transverse steerable axle to position the axle between the carrier member and the spherical ball joint pivotally connecting the axle to the vehicle chassis.

It is yet another advantage of this invention that the linkage pivotally connecting the steerable axle to the vehicle chassis minimizes elevational changes of the chassis due to relative vertical movement between the axle and the chassis during the lateral shifting movement.

It is another object of this invention to provide a linkage for pivotally supporting the steerable axle from the vehicle chassis, which is durable in construction, inexpensive of manufacture, carefree of maintenance, facile in assemblage, and simple and effective in use.

These and other objects, features, and advantages are accomplished according to the instant invention by providing a tractor having a steerable axle that pivotally moves laterally in response to a corresponding steering action of the steerable wheels mounted on the steerable axle wherein the front of the axle is pivotally supported by a four-bar linkage to control vertical movement of the chassis relative to the steerable axle during lateral relative movement between the chassis and the axle. The mechanism is composed of a spherical ball joint connecting the steerable axle to the chassis, a front carrier member pivotally connected to the chassis, and a pair of link members pivotally interconnecting the carrier member and the steerable axle. All pivot axes associated with the carrier member and the link members coincide at the spherical ball joint.

BRIEF DESCRIPTION OF THE DRAWINGS

The advantages of this invention will become apparent upon consideration of the following detailed disclosure of the invention, especially when taken into conjunction with the accompanying drawings wherein:

FIG. 7 is a front elevational view of the tractor front axle assembly similar to the view of FIG. 3, but with the front ballast assembly removed for purposes of clarity; and FIG. 8 is a front elevational view of the front axle assembly similar to the view of FIG. 7, but with the steerable axle and steerable wheels moved to effect a right hand turn of the vehicle as depicted in FIG. 6.

DETAILED DESCRIPTION OF THE PREFERRED EMBODIMENT

Figure 1:
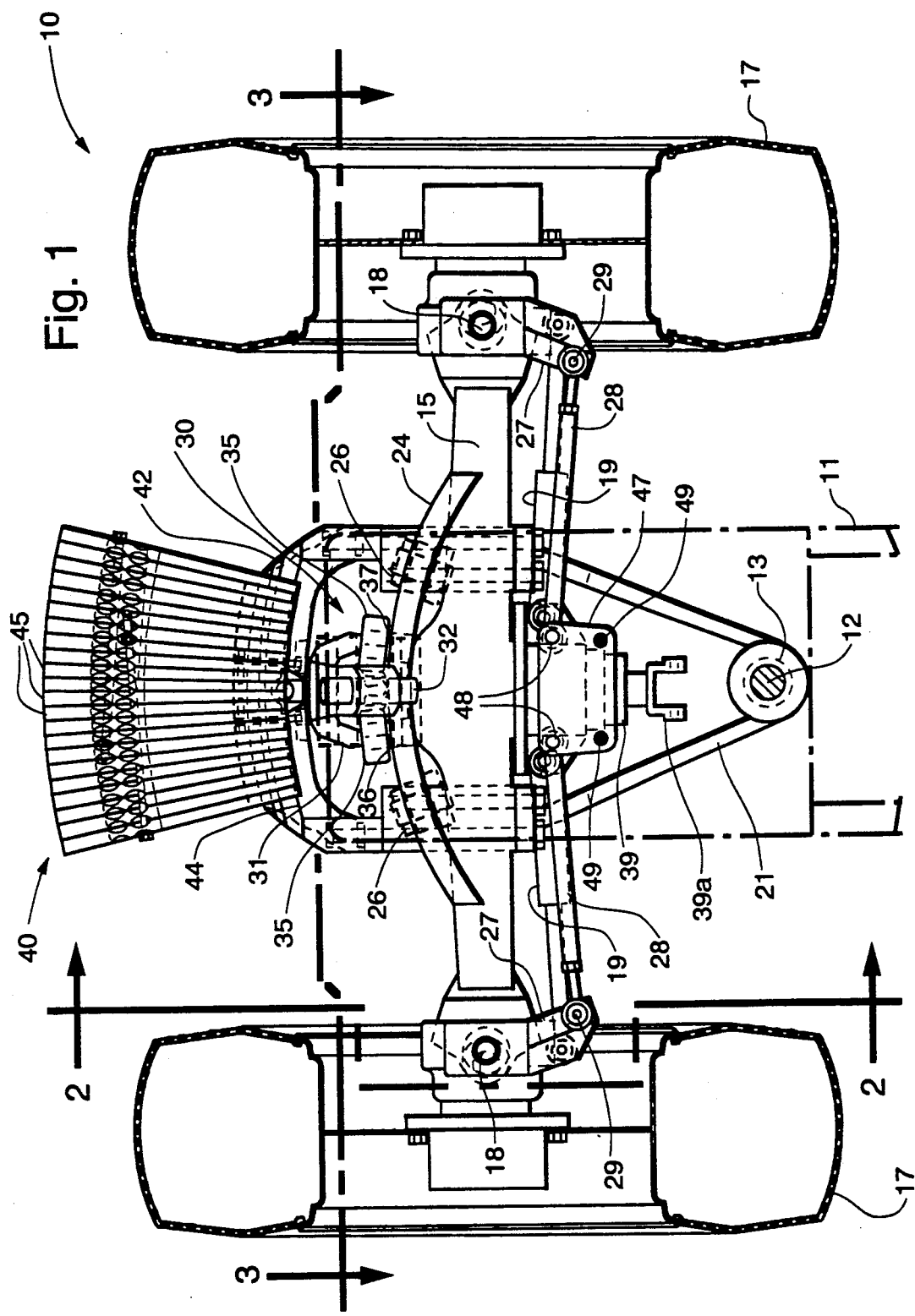
FIG. 1 is a top plan view of a front axle assembly for an agricultural tractor incorporating the principles of the instant invention, the front portion of the tractor chassis overlying the front axle assembly being shown in phantom.
Figure 2:
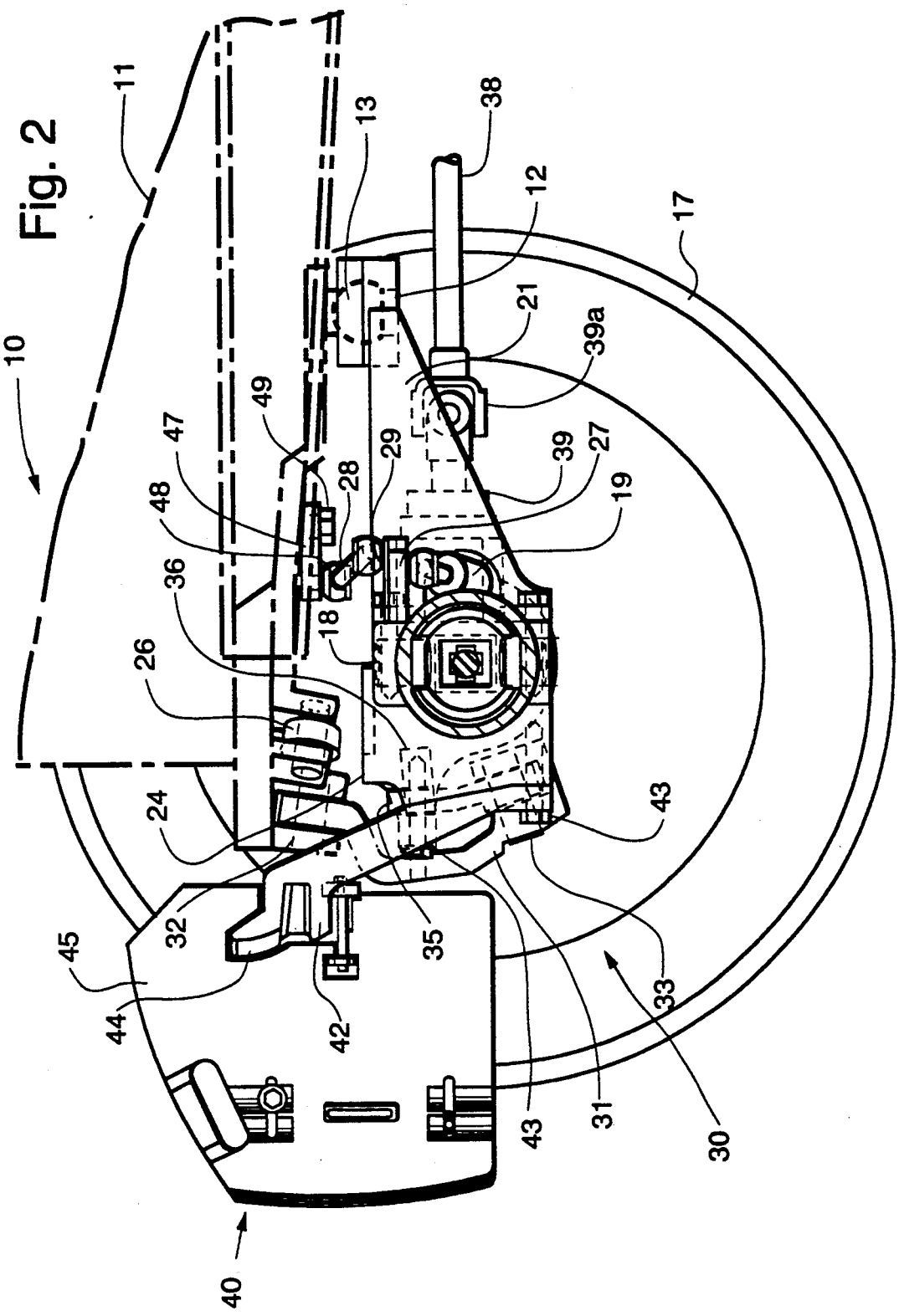
FIG. 2 is a cross-sectional view of the front axle assembly taken along lines 2—2 of FIG. 1, the front portion of the tractor chassis being shown in phantom relative to the front axle assembly.
Figure 3:
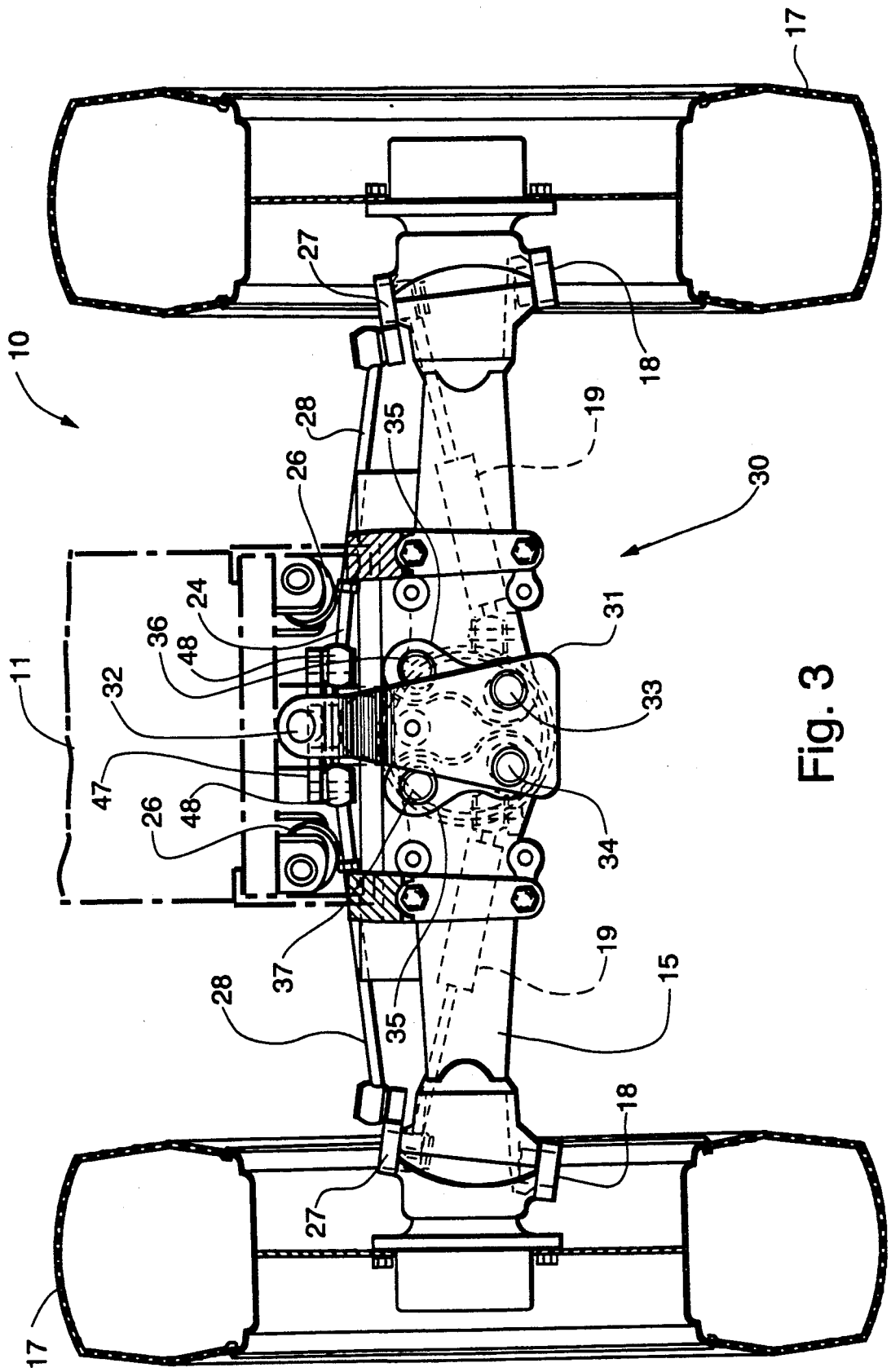
FIG. 3 is a cross-sectional view of the tractor front axle assembly taken along lines 3—3 of FIG. 1 to depict generally a front elevational view of the tractor assembly immediately rearwardly of the weights.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a spherical ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly 10 includes a transversely extending axle member 15 having pivotally mounted on the respective laterally opposing ends thereof a pair of steerable wheels 17 pivotable about respective nearly vertical king pin axes 18 to effect a steering of the wheels 17 relative to the axle member 15. A pair of hydraulic cylinders 19 interconnect the axle member 15 and the steerable wheels 17 via a steering arm 27 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet generally positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature coincident with the pivot axis 12. The chassis 11 carries a pair of laterally spaced rollers 26 that are engageable with the arcuate track 24 when the front axle member 15 oscillates about a generally horizontal axis in response to changing ground contours and undulations so that the rollers 26 provide a limit to the vertical movement of the front axle member 15 relative to the tractor chassis 11 due to an engagement thereof with the arcuate track 24.

A pair of tie rods 28 interconnecting the chassis 11 and the steerable wheels 17 transmit coordinated steerable movement of the wheels 17 relative to each other and to the front axle member 15 and to a lateral shifting movement of the chassis 11 relative to the front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of the tie rods 28 interconnecting the chassis 11 and the wheels 17 at a connection point 29 spaced inwardly toward the center of the chassis 11 and rearwardly from the respective pivot axis or king pin 18 for the corresponding steerable wheel 17 by a rearwardly and inwardly extending steering arm 27, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

Figure 4:
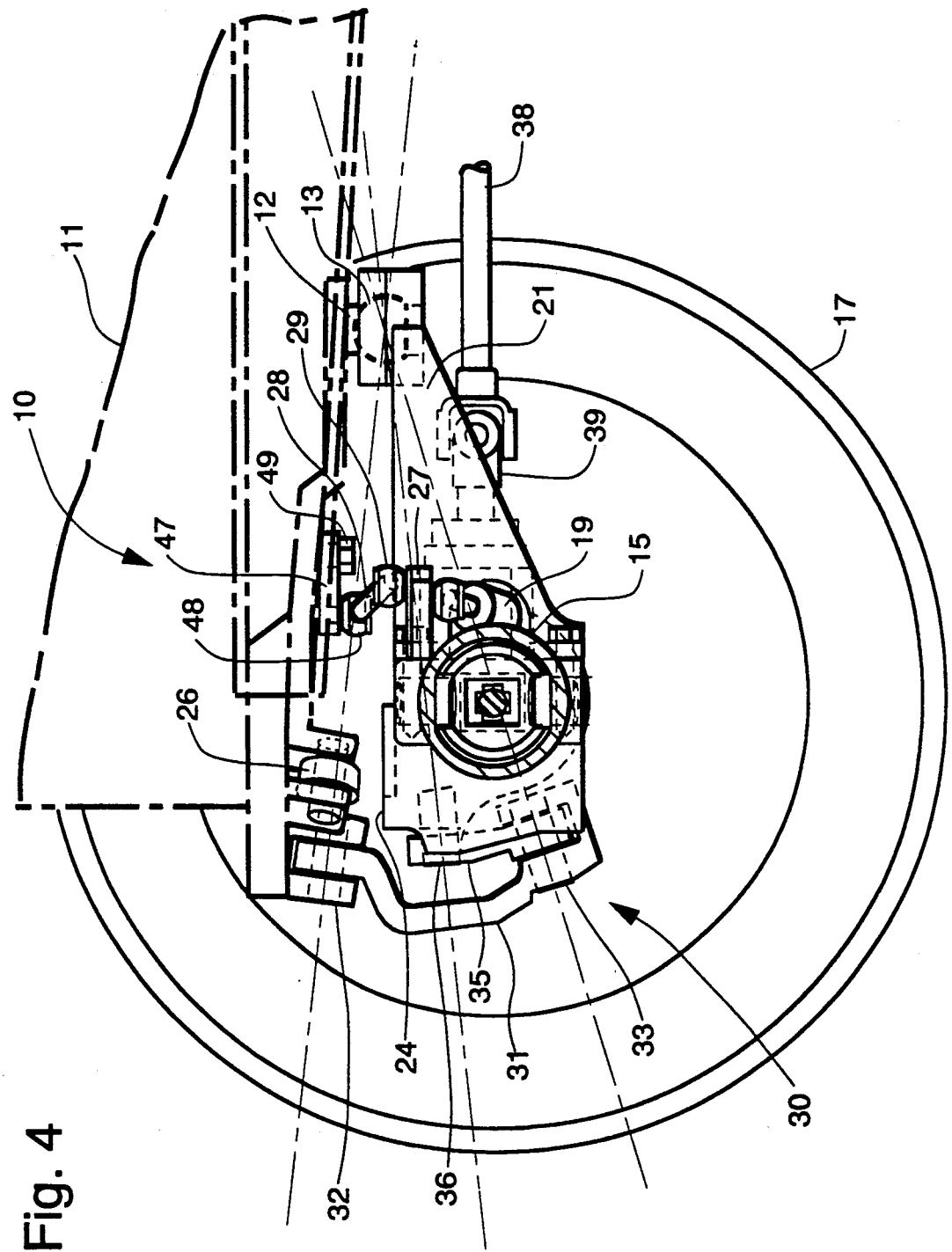
FIG. 4 is a cross-sectional view of the front axle assembly similar to FIG. 2, but with the front ballast assembly removed to better depict the linkage pivotally interconnecting the steerable axle and the vehicle chassis.
Figure 5:
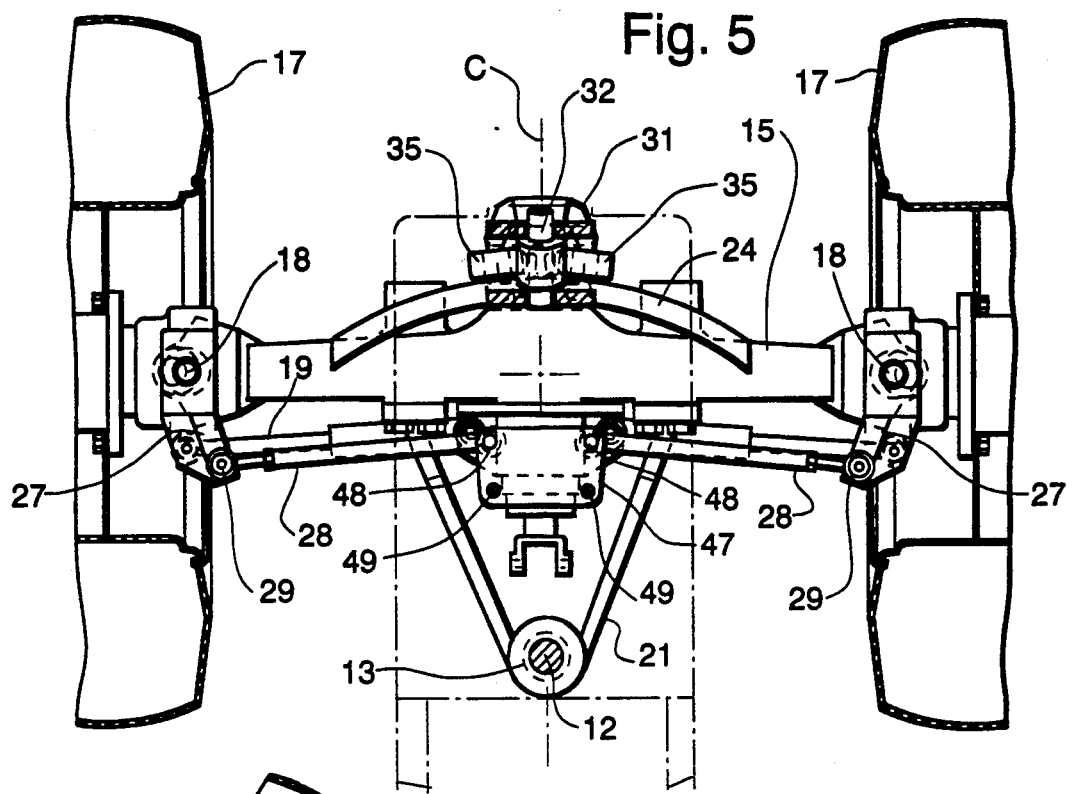
FIG. 5 is a top plan view of the front axle assembly similar to the view of FIG. 1, but with the front ballast assembly removed for purposes of clarity.

The front yoke assembly 30 has a contoured front carrier member 31 pivotally connected at a second pivot joint 32 to the chassis 11. The front carrier member 31 also carries a pair of transversely spaced third and fourth lower pivots 33, 34, respectively, for pivotally supporting a corresponding pair of dog bone-shaped links 35 which, in turn, are pivotally connected to the front axle member 15 by respective transversely spaced fifth and sixth pivots 36, 37. As depicted in FIG. 4, each of the pivots 32, 33, 34, 36 and 37 associated with the front yoke assembly 30 have a corresponding pivot axis aligned with the ball joint 13, which is located on the pivot axis 12. Accordingly, the pivot axis for each of the five pivots 32, 33, 34, 36 and 37 have a nonparallel relationship intersecting a common point at the center of the ball joint 13.

As a result, the pivotal movement of the front axle assembly 10 relative to the tractor chassis 11, resulting in a lateral shifting of the front axle member 15, is accomplished through a four-bar linkage which has very little vertical component associated with the movement thereof, yet the chassis 11 maintains a substantially uniform elevation relative to the front axle 15 throughout the range of relative movement between the front steerable axle and the vehicle chassis. The main pivot axis for lateral shifting and vertical oscillatory movement of the front axle 15 is the axis defined by the second pivot joint 32 extending through the ball joint 13, as both the pivot 32 and the ball joint 13 are fixed relative to the chassis 11. The generally transverse lines defined by the tie rods 28 extend through this main pivot axis extending through pivot 32 and ball joint 13 so that movements of the axle 15, especially oscillatory movements, causes a minimum additional steering effect to the axle 15.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 15 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

The tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 45 are supported. Since the carrier 42 moves with the front axle member 15 relative to the chassis 11, the position of the ballast assembly 40 relative to the laterally spaced front wheels 17 remains relatively fixed, thereby maintaining a substantially constant weight distribution relative to the front wheels 17.

Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 45 to increase the amount of ballast on the front axle 15 without decreasing the tire clearance below that which is acceptable for traditional tractors. Greater detail in the construction and assemblage of the individual weights 45 to form the ballast assembly 40 can be found in co-pending U. S. Pat. No. 5,219,180, issued to Randall E. Zipser, et al, on Jun. 15, 1993, the descriptive portions of which are incorporated herein reference.

The configuration of the components of the front yoke assembly 30, chassis 11 and front steerable axle 15, as the tractor steering mechanism 19 effects a turn of the tractor chassis 11, is best seen in FIGS. 5-8. The dog-bone link members 35 diverge upwardly so that the fifth and sixth pivot joints are transversely spaced further apart than the third and fourth lower pivot joints to provide a nearly parallel planar motion of the chassis 11 relative to the axle 15 and an increased measure of stability to the assembly 30. A turning of the steerable wheels 17, as exemplified by the right turn depicted in FIGS. 6 and 8, causes a corresponding relative shifting between the steerable axle 15 and the chassis 11, which in the frame of reference of the chassis 11 causes a shifting of the axle 15 in the direction of the intended turn. As described above, this relative shifting of the axle 15 shortens the turning radius and allows the tractor to make a tighter turn.

Figure 6:
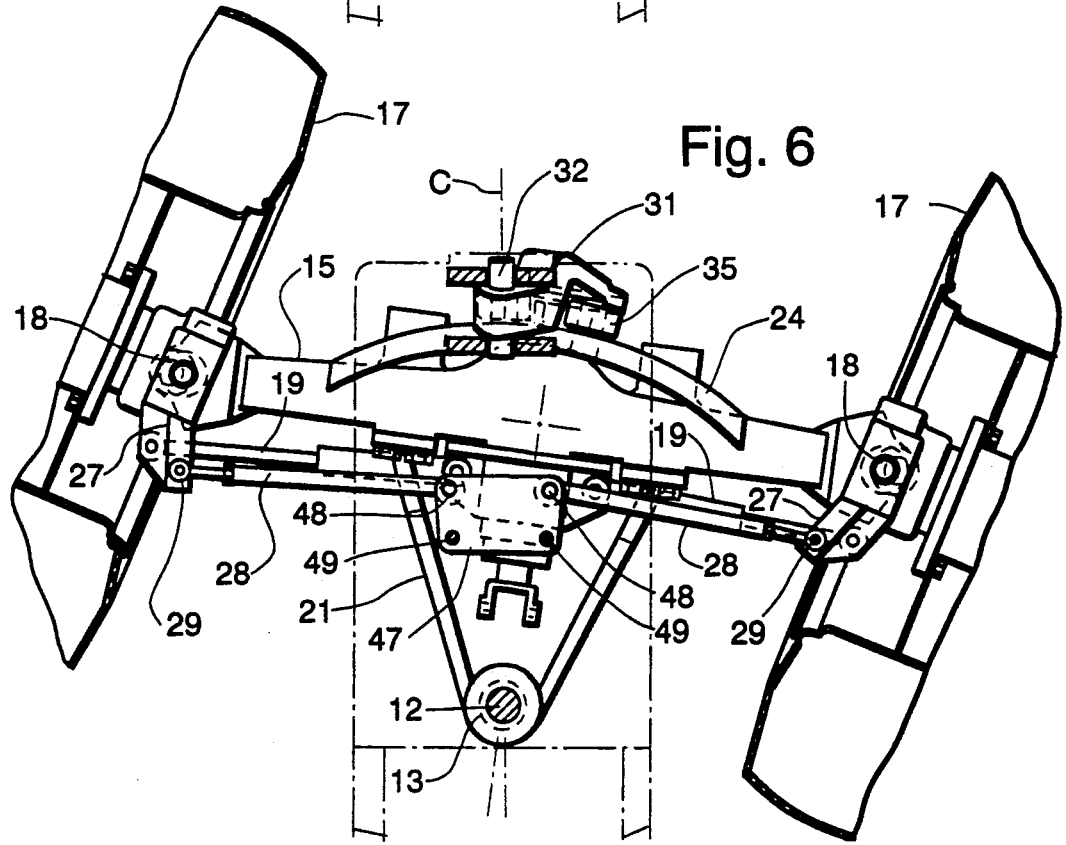
FIG. 6 is a top plan view of the front axle assembly similar to the view of FIG. 5 but with the steerable axle and steerable wheels moved to effect a right turn of the vehicle.

During such a turn, the tie rods 28 force the chassis 11 in the opposite direction from which the turn is being made, which in the frame of reference of the chassis 11 causes a relative movement of the axle 15 about the first pivot axis 12 into the direction of the turn being made. When the axle 15 moves relative to the chassis 11, the carrier member 31 pivots about its pivotal connection 32 with the chassis 11, as shown in FIGS. 6 and 8, swinging the third and fourth lower pivots 33, 34 and the connected dog-bone link members 35 toward the direction the turn is being made. Because of the configuration of the four pivots 33, 34, 36 and 37 associated with the two link members 35, the fifth and sixth upper pivots 36, 37 swing toward the direction of the turn in a parallel orientation to which they were centrally positioned. As a result, the vertical movement of the axle 15 relative to the chassis 11 is minimized during turns. The disclosed assembly 30 has been found to result in a lowered elevational change of the chassis 11 of approximately a quarter of an inch during turns, and during this minimal vertical movement, the chassis 11 remains in a parallel orientation with respect to its position prior to the turn.

The spherical ball joint 13 at the first pivot 12 accommodates any limited vertical movement of the axle 15 relative to the chassis 11 and allows oscillatory or lateral pitching movement of the axle 15 relative to the chassis 11 about the pivot 32. This oscillatory movement of the axle 15 can cause greater pivotal movement of the carrier member 31 about the pivot 32 than is shown in FIGS. 6 and 8. This particular configuration of components pivotally mounting the axle 15 to the chassis 11 for relative lateral movement results in a minimum of elevational changes for the chassis, irrespective of the movement of the axle 15, which in turn provides the ability to utilize front mounted attachments for the chassis 11 without affecting their operation during turns. Furthermore, the respective tie rods 28 are oriented such that the inwardly extending line of each of the tie rods 28 from the connection point 29 will intersect with the pivot axis extending between the pivot joint 32 and the center of the ball joint 13. This orientation of the tie rods 28 minimizes any steering effect to the wheels 17 whenever the axle 15 oscillates relative to the chassis 11.

The centering of all the pivot axes associated with the pivot joints 32, 33, 34, 36 and 37 at the center of the ball joint 13 allows the unrestricted pivotal movement of the carrier member 31 and the dog-bone link members 35 during the turning movements and for oscillatory or pitching movements as well, without requiring additional motion components to be accommodated during the relative movement of the axle 15 and the chassis 11. It will be understood by one skilled in the art that the specific orientation of these respective pivots 32, 33, 34, 36 and 37 requires the formation of a specially formed carrier member 31 and dog-bone members 35 to orient properly the respective pivots. Furthermore, the carrier member 31 has a somewhat arcuate shape to bow out around the dog-bone members 35 for their unrestricted movement between the carrier member 31 and the axle 15.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A linkage for connecting a steerable axle to a vehicle chassis comprising:
   a first pivot joint carried by said vehicle chassis to define a generally vertically extending first pivot axis, said steerable axle being connected to said vehicle chassis at said first pivot joint for movement relative thereto about said first pivot axis; and
   a carrier mechanism having associated therewith a four-bar linkage pivotally interconnecting the vehicle chassis and the steerable axle by a plurality of pivot axes, each of said pivot axes being aligned with and passing through the center of said first pivot joint.

2. The linkage of claim 1 wherein said carrier mechanism comprises:
   a carrier member pivotally supported by said vehicle chassis by a second pivot joint carried by said vehicle chassis and defining a second pivot axis extending generally horizontally and being aligned with said first pivot joint; and
   pivot connection means interconnecting said steerable axle and said carrier member to define at least a third pivot axis extending generally horizontally and being aligned with said first pivot joint.

3. The linkage of claim 2 further comprising tying means extending between steerable wheels pivotally connected to transversely opposing remote ends of said steerable axle and said chassis.

4. The linkage of claim 3 wherein said tying means includes a pair of tie rods interconnecting said chassis and said steerable wheels to effect a lateral shifting of said steerable axle in response to the pivotal movement of said wheels relative to said steerable axle.

5. The linkage of claim 4 wherein said pivot connection means includes:
   first and second link members interconnecting said carrier member and said steerable axle;
   a third pivot joint interconnecting said carrier member and said first link member to define said third pivot axis;
   a fourth pivot joint transversely spaced from said third pivot joint to interconnect said carrier member and said second link member and define a fourth pivot axis extending generally horizontally and being aligned with said first pivot joint;
   a fifth pivot joint interconnecting said first link member and said steerable axle to define a fifth pivot axis extending generally horizontally and being aligned with said first pivot joint; and
   a sixth pivot joint transversely spaced from said fifth pivot joint and interconnecting said second link member and said steerable axle to define a sixth pivot axis extending generally horizontally and being aligned with said first pivot joint.

6. The linkage of claim 5 wherein said steerable axle defines a transverse major axis and rotatably mounts opposing transversely spaced wheels at the opposite ends of said transverse major axis, said first pivot joint being located rearwardly of said transverse major axis.

7. The linkage of claim 6 wherein said first pivot joint permits movement of said steerable axle in a universal manner.

8. The linkage of claim 6 wherein said first pivot joint is a spherical joint allowing pivotal movement of said steerable axle about said first pivot axis.

9. The linkage of claim 6 wherein said fifth and sixth pivot joints are transversely spaced a greater distance than said third and fourth pivot joints.

10. The linkage of claim 9 wherein said carrier member and said link members are positioned forwardly of said steerable axle with said transverse major axis of said steerable axle being positioned between said carrier member and said first pivot joint.

11. A linkage for connecting a steerable axle to a vehicle chassis comprising:
    a first pivot joint carried by said vehicle chassis to define a generally vertically extending first pivot axis, said steerable axle being connected to said vehicle chassis at said first pivot joint for movement relative thereto about said first pivot axis;
    a carrier member pivotally supported by said vehicle chassis by a second pivot joint carried by said vehicle chassis and defining a second pivot axis extending generally horizontally and being aligned with said first pivot joint;
    a first link member connected at one end to said carrier member by a third pivot joint defining a third pivot axis extending generally horizontally and being aligned with said first pivot joint, said first link member being connected at a remote second end to said steerable axle by a fifth pivot joint defining a fifth pivot axis extending generally horizontally and being aligned with said first pivot joint; and
    a second link member connected at one end to said carrier member by a fourth pivot joint transversely spaced from said third pivot joint, defining a fourth pivot axis extending generally horizontally and being aligned with said first pivot joint, said second link member being connected at a remote second end to said steerable axle by a sixth pivot joint transversely spaced from said fifth pivot joint, defining a sixth pivot axis extending generally horizontally and being aligned with said first pivot joint.

12. The linkage of claim 11 wherein said first pivot joint is a spherical joint permitting pivotal movement of said steerable axle in a universal manner, including movement in a generally horizontal manner about said first pivot axis.

13. The linkage of claim 12 wherein said steerable axle defines a transverse major axis and rotatably mounts opposing transversely spaced wheels at the opposite ends of said transverse major axis, said first pivot joint being located rearwardly of said transverse major axis.

14. The linkage of claim 13 wherein said wheels are pivotally mounted to said steerable axle to rotate relative thereto.

15. The linkage of claim 12 wherein the transverse distance between said fifth and sixth pivot joints is greater than the transverse distance between said third and fourth pivot joints.

16. The linkage of claim 15 wherein said carrier member and said first and second link members are positioned forwardly of said steerable axle with said steerable axle being positioned between said carrier member and said first pivot joint.

17. In a vehicle having a chassis, a transverse axle pivotally supported from said chassis for lateral movement relative thereto, said transverse axle having a pair of steerable wheels pivotally connected to the opposing transverse ends of said axle, and a steering mechanism operably connected to said steerable wheels to control the pivotal movement thereof relative to said axle for controlling the direction of travel of said vehicle, said steering mechanism including means for effecting relative pivotal movement between said axle and said chassis in response to the pivotal movement of said steerable wheels, an improved linkage pivotally interconnecting said transverse axle and said chassis comprising:

a first spherical pivot joint carried by said vehicle chassis to define a generally vertically extending first pivot axis, said transverse axle being connected to said chassis at said first pivot joint for movement relative thereto about said first pivot axis;

a carrier member pivotally supported by said vehicle chassis by a second pivot joint carried by said vehicle chassis and defining a second pivot axis extending generally horizontally and being aligned with and passing through said first pivot joint; and pivot connection means interconnecting said transverse axle and said carrier member to define at least a third pivot axis extending generally horizontally and being aligned with and passing through said first pivot joint, said pivot connection means allowing a generally lateral pivotal movement of said transverse axle about said first pivot axis in a parallel orientation relative to said chassis.

18. The vehicle of claim 17 wherein said pivot connection means includes:

first and second link members interconnecting said carrier member and said transverse axle;

a third pivot joint interconnecting said carrier member and said first link member to define said third pivot axis;

a fourth pivot joint transversely spaced from said third pivot joint to interconnect said carrier member and said second link member and define a fourth pivot axis extending generally horizontally and being aligned with said first pivot joint;

a fifth pivot joint interconnecting said first link member and said transverse axle to define a fifth pivot axis extending generally horizontally and being aligned with said first pivot joint; and a sixth pivot joint transversely spaced from said fifth pivot joint and interconnecting said second link member and said transverse axle to define a sixth pivot axis extending generally horizontally and being aligned with said first pivot joint.

19. The vehicle of claim 18 wherein said fifth and sixth pivot joints are transversely spaced a greater distance than said third and fourth pivot joints.

20. The vehicle of claim 19 wherein said carrier member and said link members are positioned forwardly of said transverse axle with said transverse axle being positioned between said carrier member and said first pivot joint.

21. The vehicle of claim 20 wherein said transverse axle includes a longitudinally elongated center housing for connection between said first and said fifth and sixth pivot joints.

* * * * *